(12) United States Patent
Golbandi et al.

(10) Patent No.: US 11,494,666 B2
(45) Date of Patent: Nov. 8, 2022

(54) SYSTEMS AND METHODS FOR ONLINE CONTENT RECOMMENDATION

(71) Applicant: Yahoo Holdings, Inc., Sunnyvale, CA (US)

(72) Inventors: Nadav Golbandi, Sunnyvale, CA (US); Chao Wang, Beijing (CN)

(73) Assignee: YAHOO ASSETS LLC, Dulles, VA (US)

( * ) Notice: Subject to any disclaimer, the term of this patent is extended or adjusted under 35 U.S.C. 154(b) by 1251 days.

(21) Appl. No.: 14/748,333

(22) Filed: Jun. 24, 2015

(65) Prior Publication Data

US 2016/0371589 A1 Dec. 22, 2016

Related U.S. Application Data

(63) Continuation of application No. PCT/CN2015/081615, filed on Jun. 17, 2015.

(51) Int. Cl.
*G06N 5/04* (2006.01)
*G06N 20/00* (2019.01)
(Continued)

(52) U.S. Cl.
CPC ........... *G06N 5/04* (2013.01); *G06F 16/9535* (2019.01); *G06N 20/00* (2019.01); *G06Q 30/0241* (2013.01); *G06Q 30/0269* (2013.01)

(58) Field of Classification Search
CPC ........ G06N 5/04; G06N 7/005; G06N 99/005; G06N 20/00; G06F 16/9535; G06Q 30/0241; G06Q 30/0269
See application file for complete search history.

(56) References Cited

U.S. PATENT DOCUMENTS

2008/0086558 A1* 4/2008 Bahadori ............ G06F 11/3438
709/224
2010/0268661 A1 10/2010 Levy et al.
(Continued)

FOREIGN PATENT DOCUMENTS

| CN | 103136275 A | 6/2013 |
|---|---|---|
| CN | 103703460 A | 4/2014 |
| CN | 104008184 A | 8/2014 |

OTHER PUBLICATIONS

Agarwal, D., & Chen, B. C. (Jun. 2009). Regression-based latent factor models. In Proceedings of the 15th ACM SIGKDD international conference on Knowledge discovery and data mining (pp. 19-28). ACM. (Year: 2009).*

(Continued)

*Primary Examiner* — Michael J Huntley
*Assistant Examiner* — Oluwatosin O Alabi
(74) *Attorney, Agent, or Firm* — Cooper Legal Group (57) ABSTRACT

The present disclosure relates to computer systems implementing methods for online content recommendation. The computer systems may be configured to receive a training sample from a first client device corresponding to a predefined feedback interacting with online content displayed on the first client device; update a preexisting training database in real-time based on the received training sample to generate an updated training sample, wherein prior to being updated based on the training sample received from the first client, the training database includes a set of historical training samples; conduct a regression training to a computer learning model in real-time, using the updated training sample, to produce a set of trained parameters for an online content recommendation model; call the set of trained parameters in real-time to determine recommend online content for a second user with the online content recommendation model; and send the recommended online content to a second client device of the second user.

20 Claims, 6 Drawing Sheets

(51) Int. Cl.
*G06Q 30/02* (2012.01)
*G06F 16/9535* (2019.01)

(56) References Cited

U.S. PATENT DOCUMENTS

| | | | |
|---|---|---|---|
| 2011/0289533 A1* | 11/2011 | White | G06F 16/41 725/46 |
| 2012/0309376 A1* | 12/2012 | Huang | H04M 1/72572 455/418 |
| 2013/0151539 A1* | 6/2013 | Shi | G06F 17/30867 707/754 |
| 2014/0222622 A1 | 8/2014 | Du et al. | |
| 2014/0223099 A1* | 8/2014 | Kidron | G06F 12/0806 711/118 |
| 2014/0229679 A1* | 8/2014 | Santhanam | G06F 16/9574 711/135 |
| 2014/0279736 A1* | 9/2014 | Glass | G06F 17/30029 706/12 |
| 2015/0020126 A1* | 1/2015 | Kegel | G06F 17/30029 725/87 |
| 2015/0112918 A1* | 4/2015 | Zheng | G06Q 30/02 706/48 |
| 2016/0342903 A1* | 11/2016 | Shumpert | G06N 99/005 |

OTHER PUBLICATIONS

International Search Report and Written Opinion of International Searching Authority, dated Mar. 15, 2016 in International Application No. PCT/CN2015/081615.

* cited by examiner

SYSTEMS AND METHODS FOR ONLINE CONTENT RECOMMENDATION

PRIORITY STATEMENT

This application is a continuation of International Application No. PCT/CN2015/081615, filed on Jun. 17, 2015, in the State Intellectual Property Office of the People's Republic of China, the disclosure of which is incorporated herein in its entirety by reference.

TECHNICAL FIELD

The present disclosure generally relates to online content selection. Specifically, the present disclosure relates to online content recommendation systems and methods that use real-time trained computer learning models.

BACKGROUND

Nowadays more and more people rely on Internet to obtain important information in their life. A user may read news online, manage investment online, purchase commodities online, and read and/or write online product reviews, etc. The user may obtain desired information through various hardware and software tools, such as a general-purpose Internet browser implemented in a desktop computer or through a specially designed application via a smart phone or tabled computer. Thus accurately predicting what information a user is looking for and pushing a recommendation of selected information to the user becomes critically important to enhance user experiences and creating commercial opportunities for an online information provider, such as news providers, advertisers, and online grocery stores etc.

To predict a user's point of interest and recommend pertinent information to the user, current recommendation systems normally adopt a two-system architecture: an offline system for training a mathematical model for information selection; and an online serving system for determining and recommending certain information to the user. The offline system and online system are two separate systems that operate independently. The offline system uses historical data of the user in training the mathematical model. Once the model is trained the offline system pushes the trained model to the serving system. The serving system then uses the trained model in determining and recommending certain information to the user, so that when the user opens the Internet browser in his/her desktop computer or a target application from his/her mobile phone, the recommended information (e.g., news, products, etc.) will be displayed to the user to read.

The two-system architecture has several technical issues. First, the model is being trained in an offline training system and then pushed to the online serving system periodically. This process is complicated to realize; and since the period of updating the model is relatively long with respect to an information update speed in Internet, the online serving system cannot update and/or refresh the model in real-time. Second, in order to keep the model that the online serving system uses and the model that the offline serving system trains in synchronization, both the online serving and the offline training systems have to use a same set of features for a given event and independently generate the same set of features; Third, two-system architecture must keep a high networking overhead in order for the offline training system to push the model to and receive instrumentation data sent from the online serving system; Finally, because of the complicity of the system and high intensity of mutual communication, the system often includes duplicated resources in both of the online and offline systems to handle their respective Input/Output (IO) as well as parsing and generating the features.

SUMMARY

The present disclosure provides recommendation systems and methods that incorporate information prediction and a model training in a single online phase-serving system. The online phase-serving system also includes a sample buffer that joins together as training samples request features and feedbacks related to a user. With the present disclosure, the online content recommendation phase-serving systems and methods may support recommendation in scale in an online manner, in which the model adapted therein is updated in real-time and with minimal communication cost, and utilizes a simplified architecture that saves hardware resources of a client device and a computer system. As a result, the online phase-serving systems and methods improve technologies of online content recommendation and enhance performances of an electronic device implementing the recommendation methods.

The online phase-serving systems and methods in the present disclosure adopt a unique data gathering and computer data processing procedure. There are at least two differences that distinguish the online phase-serving systems from other content recommendation systems in terms of data collection and processing. First, the online phase-serving systems and methods in the present disclosure collect and generate online training samples via a two-step procedure. The systems and methods first collect a user request for online content and cache the user request in the sample buffer, waiting for a user feedback to an item of the online content only for a predetermined period of time. After receiving the user feedback within the predetermined period of time, the systems and methods combine the feedback with the user request to generate an online training sample. Thus original data of the online training samples are not received by the systems and methods as a single package. Second, the user request and user feedback are transmitted through a feedback pipeline. Different from a general pipeline seen in other recommendation systems, which transmit feedback signals to an offline database, the feedback pipeline in the present disclosure transmits feedback signals back to the sample buffer, an online component of the online phase-serving systems.

In terms of data processing, the online phase-serving systems and methods distinguish themselves from traditional content recommendation systems by integrating data collection, model training, and model utilization into a single real-time data processing procedure. The online training sample is generated in real-time after a user conducted a feedback action to an item in the recommended online content. The training samples are then used to train a computer-learning model in a real-time manner. Training results from the model are then inputted into a content recommendation model to serve to other user request in a real-time manner. Thus the entire procedure of data collection, model training, and model utilization occurs in real-time.

According to an aspect of the present disclosure, a computer system may comprise a storage medium comprising a set of instructions for online content recommendation; and a processor in communication with the storage medium. When executing the set of instructions, the processor is directed to receive a training sample from a first client device in communication with the computer system, the training sample corresponding to a predefined feedback action taken by a first user interacting with online content displayed on the first client device; update a preexisting training database in real-time based on the received training sample to generate an updated training sample, wherein prior to being updated based on the training sample received from the first client, the training database includes a set of historical training samples; conduct a regression training to a computer learning model in real-time, using the updated training sample, to produce a set of trained parameters for an online content recommendation model; call the set of trained parameters in real-time to determine recommend online content for a second user with the online content recommendation model; and send the recommended online content to a second client device of the second user.

According to another aspect of the present disclosure, a method for online content recommendation may comprise: receiving, by a computer system, a training sample from a first client device in communication with the computer system, the training sample corresponding to a predefined feedback action taken by a first user interacting with online content displayed on the first client device; updating, by the computer system, a preexisting training database in real-time based on the received training sample to generate an updated training sample, wherein prior to being updated base don the training sample received from the first client, the training database includes a set of historical training samples; conducting, by the computer system, a regression training to a computer learning model in real-time, using the updated training sample, to produce a set of trained parameters for an online content recommendation model; calling the set of trained parameters in real-time to determine recommended online content for a second user with the online content recommendation model; and sending, by the computer system, the recommended online content to a second client device of the second user.

According to yet another aspect of the present disclosure, a computer-readable non-transitory storage medium may comprise a set of instructions for online content recommendation. When a processor of a computer system executes the set of instructions, the set of instructions may direct the processor to perform the following operations: receiving a training sample from a first client device in communication with the computer system, the training sample corresponding to a predefined feedback action taken by a first user interacting with online content displayed on the first client device; updating a preexisting training database in real-time based on the received training sample to generate an updated training sample, wherein prior to being updated based on the training sample received from the first client, the training database includes a set of historical training samples; conducting a regression training to a computer learning model in real-time, using the updated training sample to produce a set of trained parameters for an online content recommendation model; call the set of trained parameters in real-time to determine recommended online content for a second user with the online content recommendation model; and sending the recommended online content to a second client device of the second user.

BRIEF DESCRIPTION OF THE DRAWINGS

The described systems and methods may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

The present disclosure provides online phase-serving systems and methods for online content recommendation. Unlike the traditional systems that use independent offline training systems for content recommendation model training, the present systems and methods incorporate information prediction and model training in a single online serving system. The present systems and methods also conduct model training and use the training results in real-time with respect to training sample collection. Here, real-time operation in the online phase-serving system means that input data is processed within milliseconds so that it is available virtually immediately. To produce training samples, the online phase-serving system also includes a sample buffer that joining request features and feedbacks related to a user together in an online and real-time manner. Thus with the present disclosure, the online content recommendation phase-serving systems and methods may support recommendation in scale online and in real-time, and the model adapted therein is updated in real-time and with minimal communication cost and much more simplified architecture to save hardware resources of a terminal device and a computer system. As a result, the online phase-serving systems and methods improve technologies of online content recommendation and enhance performances of an electronic device implementing the recommendation methods.

Subject matter will now be described more fully hereinafter with reference to the accompanying drawings, which form a part hereof, and which show, by way of illustration, specific example embodiments.

Figure 1:
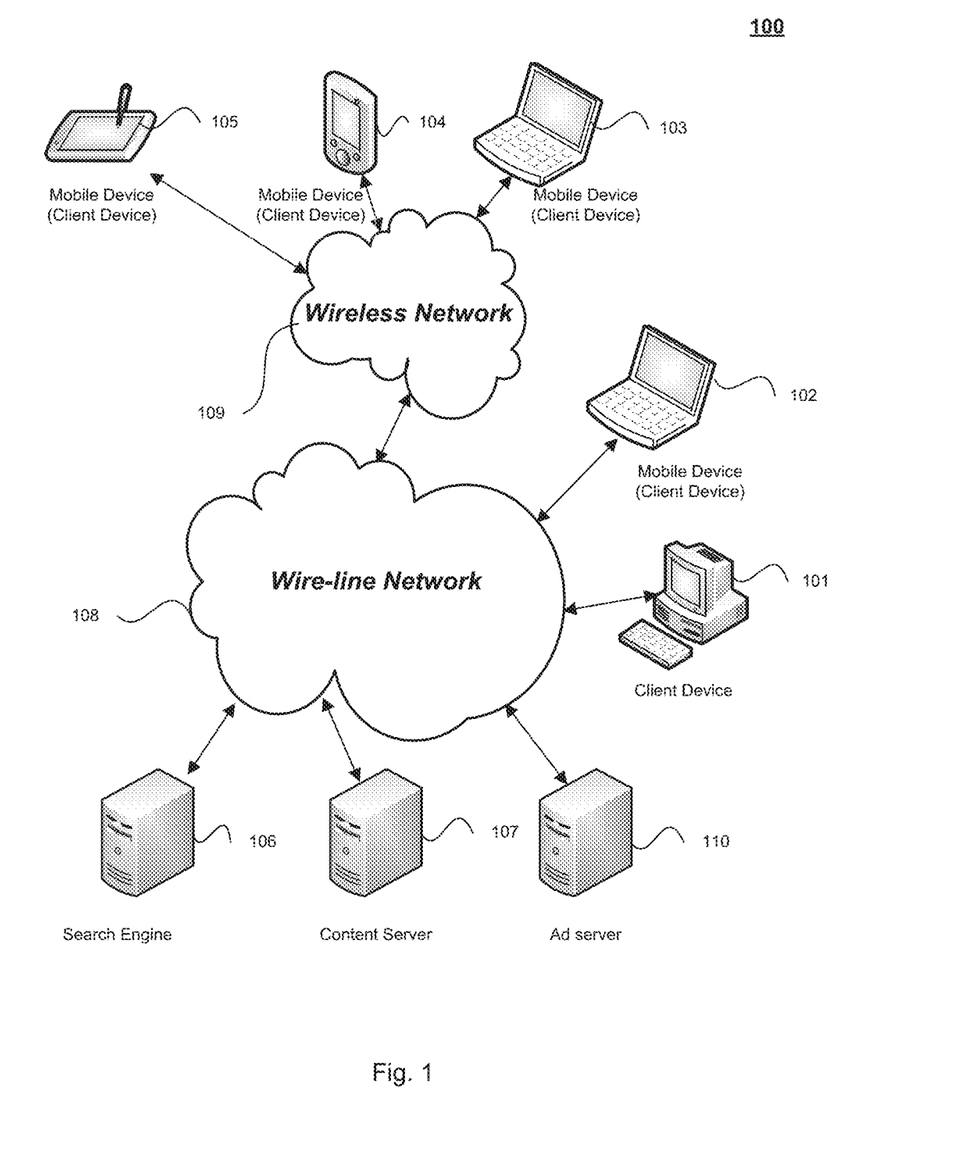
FIG. 1 is a block diagram of an example online information system.

FIG. 1 is a schematic diagram of one embodiment illustrating a network environment in which the systems and methods in the present application may be implemented. Other embodiments of the network environments that may vary, for example, in terms of arrangement or in terms of type of components, are also intended to be included within claimed subject matter. As shown, FIG. 1, for example, a network 100 may include a variety of networks, such as Internet, one or more local area networks (LANs) and/or wide area networks (WANs), wire-line type connections 108, wireless type connections 109, or any combination thereof. The network 100 may couple devices so that communications may be exchanged, such as between servers (e.g., search engine 106, content server 107, and ad server 110 etc.) and client devices (e.g., non-mobile device 101 and mobile device 102-105) or other types of devices, including between wireless devices coupled via a wireless network, for example. A network 100 may also include mass storage, such as network attached storage (NAS), a storage area network (SAN), or other forms of computer or machine readable media, for example.

A network may also include any form of implementation that connects individuals via communications network or via a variety of sub-networks to transmit/share information. For example, the network may include content distribution systems, such as peer-to-peer network, or social network. A peer-to-peer network may be a network employ computing power or bandwidth of network participants for coupling nodes via an ad hoc arrangement or configuration, wherein the nodes serves as both a client device and a server. A social network may be a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link. Overall, any type of network, traditional or modern, that may facilitate information transmitting or advertising is intended to be included in the concept of network in the present application.

Figure 2:
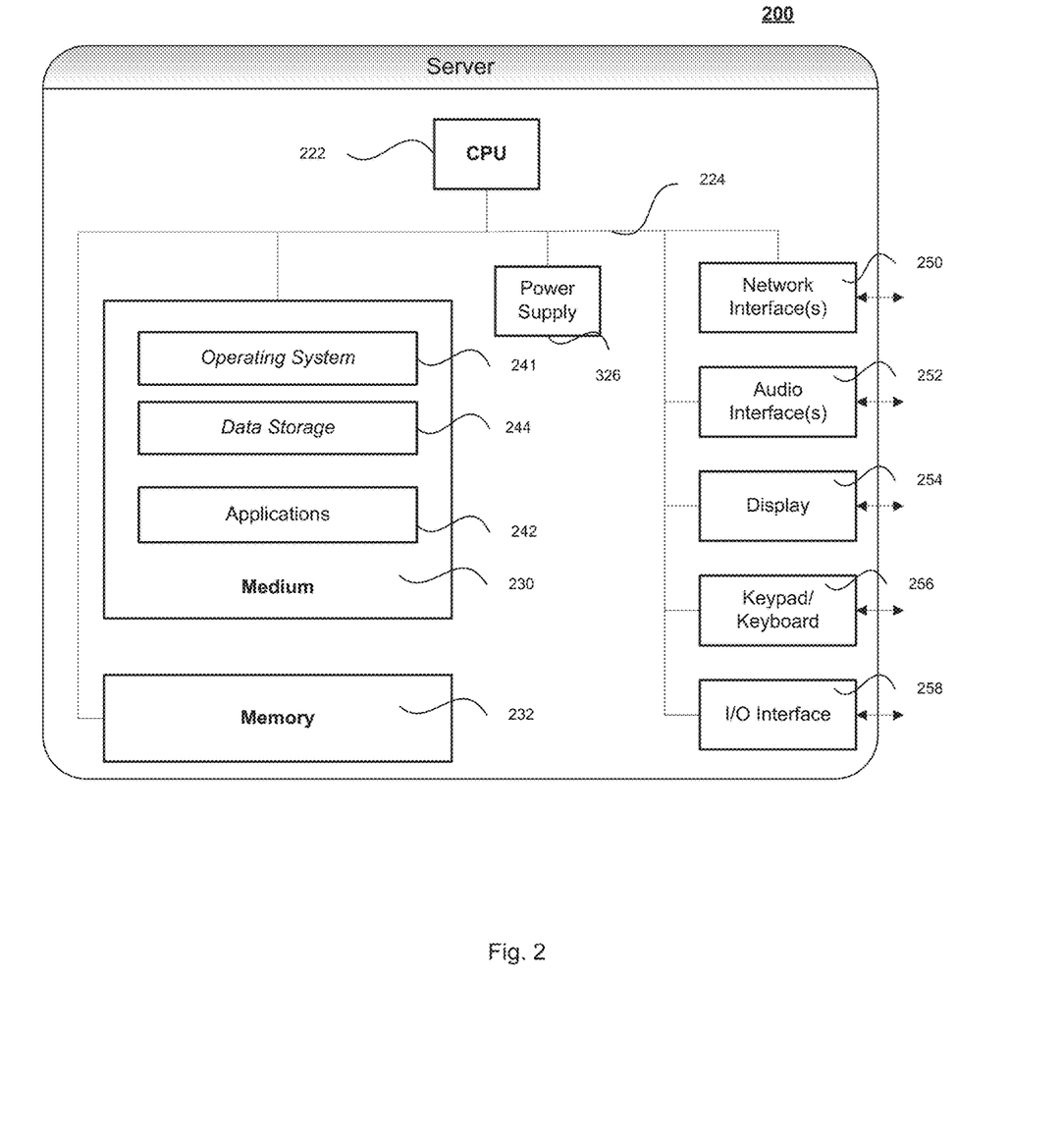
FIG. 2 is a schematic diagram illustrating an example embodiment of a server.

FIG. 2 is a schematic diagram illustrating an example embodiment of a server 200. The server 200 may be used as the search engine 106, the content server 107, and the ad server 110 of FIG. 1. A server 200 may vary widely in configuration or capabilities, but it may include one or more processor 222 (e.g., a CPU) and memory 232, one or more media 230 (such as one or more mass storage devices) storing application programs 242 or data 244, one or more power supplies 226, one or more wired or wireless network interfaces 250, one or more input/output interfaces 258, and/or one or more operating systems 241, such as Windows Server™, Mac OS X™, Unix™, Linux™, FreeBSD™, or the like. Thus a server 200 may include, as examples, dedicated rack-mounted servers, desktop computers, laptop computers, set top boxes, mobile computational devices such as smart phones, integrated devices combining various features, such as two or more features of the foregoing devices, or the like.

The medium 230 and/or the memory 232 may be non-transitory processor-readable storage media. For example, the non-transitory processor-readable storage media may be a RAM memory, flash memory, ROM 334, 340 memory, EPROM memory, EEPROM memory, registers, hard disk, a removable disk, a CD-ROM, or any other form of non-transitory storage medium known in the art. The non-transitory processor-readable storage media may store sets of instructions, or units and/or modules that include the sets of instructions, for conducting operations and/or method steps described in the present disclosure. Alternatively, the units and/or modules may be hardware disposed in the server 200 configured to conduct operations and/or method steps described in the present disclosure. The processor 222 may be configured to execute the sets of instructions and perform the operations in example embodiments of the present disclosure.

The content server 107 illustrated in FIG. 1 may be a server of a website, and the search engine 106 and the ad server 110 may be implemented as content servers or may be in communication with content servers. A content server may include a device that includes a configuration to provide content via a network to another device. A content server may, for example, host a site, such as a social networking site, examples of which may include, but are not limited to, Flicker™, Twitter™, Facebook™, LinkedIn™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers.

Figure 3:
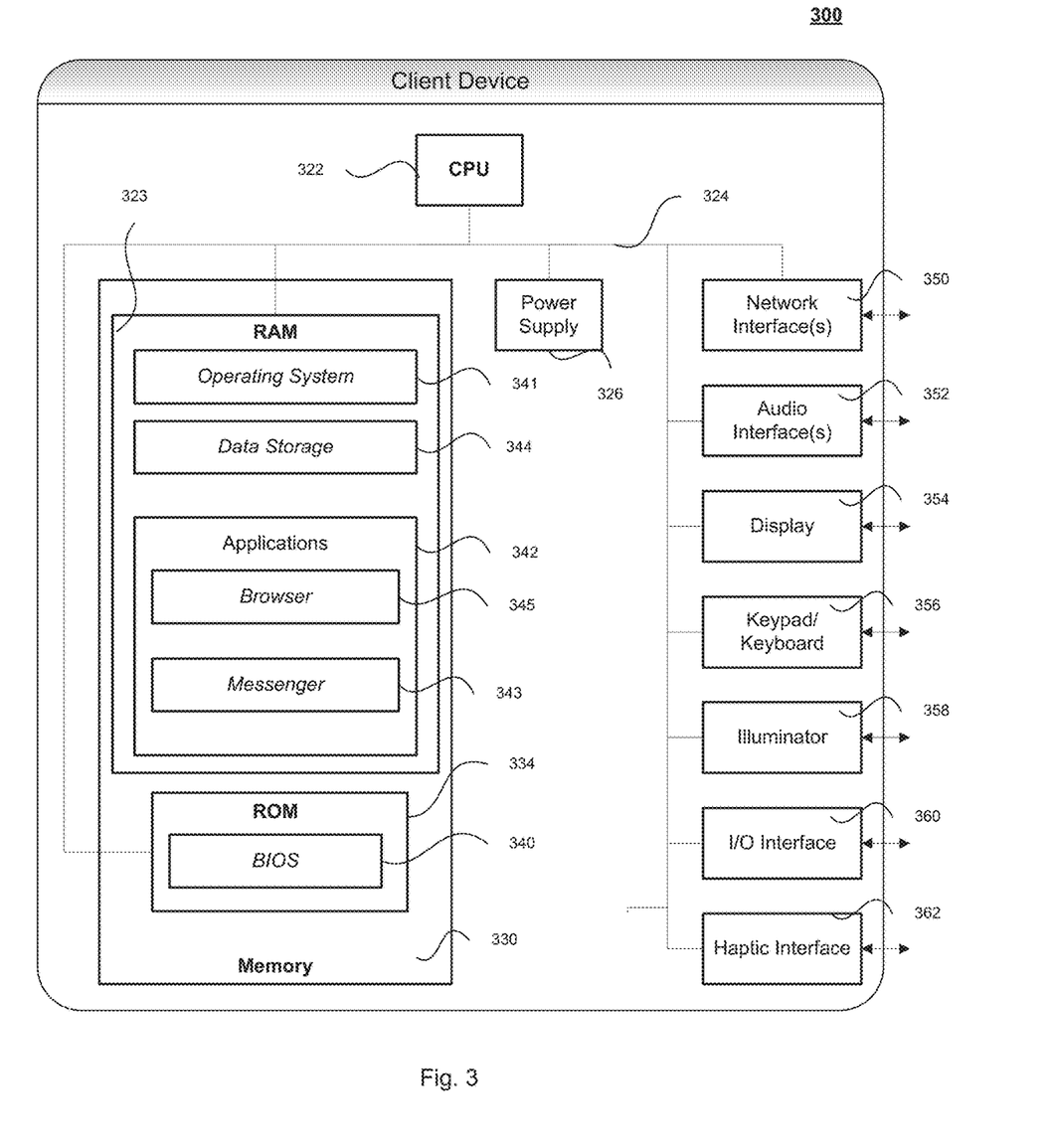
FIG. 3 is a schematic diagram illustrating an example embodiment of a client device.

FIG. 3 is a schematic diagram illustrating an example embodiment of a client device 300 that may be used as the client device 101-105. The client device may include apparatuses to execute methods and software systems introduced in the present disclosure. The client device 300 may be a computing device capable of executing a software system. The client device 300 may, for example, be a device such as a personal desktop computer or a portable device, such as a laptop computer, a tablet computer, a cellular telephone, or a smart phone.

The client device 300 may vary in terms of capabilities or features. Claimed subject matter is intended to cover a wide range of potential variations. For example, the client device 300 may include a keypad/keyboard 356. It may also include a display 354, such as a liquid crystal display (LCD), or a display with a high degree of functionality, such as a touch-sensitive color 2D or 3D display. In contrast, however, as another example, a web-enabled client device 300 may include one or more physical or virtual keyboards, and mass storage medium 330.

The client device 300 may also include or may execute a variety of operating systems 341, including an operating system, such as a Windows™ or Linux™, or a mobile operating system, such as iOS™, Android™, or Windows Mobile™. The client device 300 may include or may execute a variety of possible applications 342, such as an electronic game 345. An application 342 may enable communication with other devices via a network, such as communicating with another computer, another client device, or server via a network.

Further, the client device 300 may include one or more non-transitory processor-readable storage media 330 and one or more processors 322 (e.g., CPU) in communication with the non-transitory processor-readable storage media 530. For example, the non-transitory processor-readable storage media 330 may be a RAM memory, flash memory, ROM 334, 340 memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the client device 300 configured to conduct operations and/or method steps described in the present disclosure. The one or more processors may be configured to execute the sets of instructions and perform the operations in example embodiments of the present disclosure.

Merely for illustration, only one processor will be described in client devices and servers that execute operations and/or method steps in the following example embodiments. However, it should be note that the client devices and servers in the present disclosure may also include multiple processors, thus operations and/or method steps that are performed by one processor as described in the present disclosure may also be jointly or separately performed by the multiple processors. For example, if in the present disclosure a processor executes both step A and step B, it should be understood that step A and step B may also be performed by two different processors jointly or separately in the client device (e.g., the first processor executes step A and the second processor executes step B, or the first and second processors jointly execute steps A and B).

Figure 4:
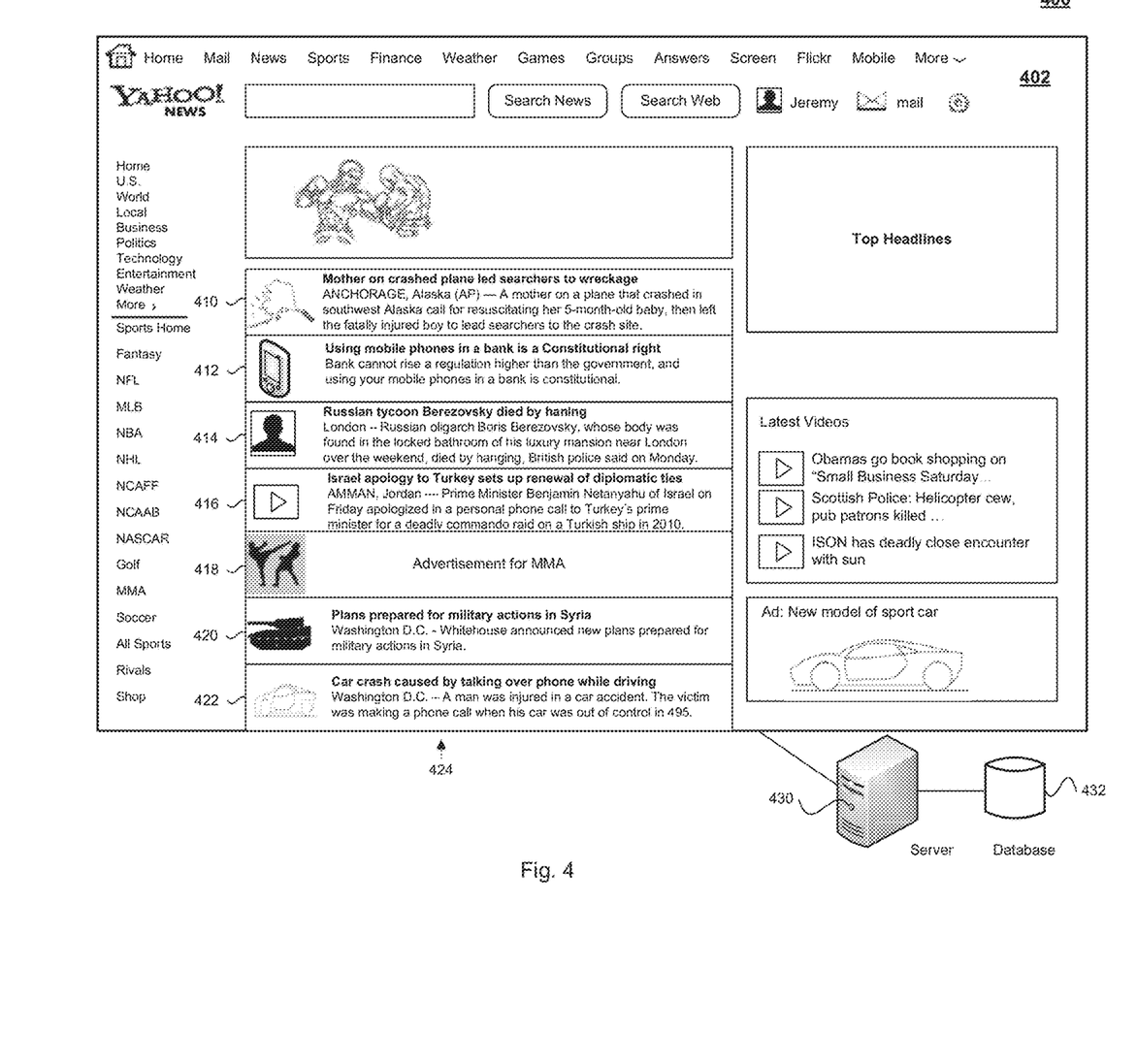
FIG. 4 is an example illustrating a system for providing a user interface of a client device with recommended content.

FIG. 4 is an example illustrating a system 400 for providing a user interface of a client device 300 with recommended content. The user interface may be, but is not limited to, a window of an Internet browser in a computer device, or a user interface of an application installed in a mobile device, such as a smart phone or a tablet computer.

The system 400 may include at least one server 430. The server 430 may be a cumulative representation of the servers 106, 107, and 110 in FIG. 1 or may be a cumulative representation of a part of these servers. The server 430 may be in communication with at least one database 432 to provide data for a user interface 402. For example, the data displayed in the user interface 402 may be a webpage of a website. The webpage may be a front page, landing page, or a webpage of a specific topic (e.g., sports, finance, news etc.) of the website. The database 432 may include a content database, including a plurality of articles to be displayed on the webpage. The articles may be any form of content items. For example, the articles may be textual items (e.g., textual reports, stories, etc.) or contents of multimedia (e.g., audio/video clips) or a combination thereof. The database 432 may also include an ad database, including a plurality of ads to be displayed on the webpage. The database 432 may be stored in a non-transitory processor-readable storage medium in communication with the server 430.

The webpage may include a column of stream 424, which may be positioned in the center column of the webpage. The stream 424 may include a stream of slots, in which a sequence of items 410, 412, 414, 416, 418, 420, 422 are displayed, one item after another. Each item may be an article 410, 412, 414, 416, 418, 422 or an advertisement 420. Clicking or otherwise selecting the item may re-direct the user interface 402 to a webpage with the additional information of the item.

The stream 424 of items 410, 412, 414, 416, 418, 420, 422 may include any type of content items. For example, the articles 410, 412, 414, 416, 418, 422 may include news, business-related articles, sports-related articles, etc. In addition to textual or graphical content, the articles 410, 412, 414, 416, 418, 422 may include other data, such as audio and video data or applications.

The items 410, 412, 414, 416, 418, 420, 422 may be individually selected for the user that is viewing the webpage. The items 410, 412, 414, 416, 418, 420, 422 are selected and recommended to the user based on features related to the user at the moment. For example, the features may include the user's demographic information such as age, gender, income, point of interest, location etc. The features may also include the time that the user opens the user interface (a timestamp showing a time that the user request occurs), identification and/or parameters of the client device that opens the user interface etc. Accordingly, different users may see different lists of items 410, 412, 414, 416, 418, 420, 422 in the stream 424 even if the users are visiting the same webpage; and a same user may see different list of items 410, 412, 414, 416, 418, 420, 422 in the stream 424 if the user opens the user interface at different time. For example, if user A is a fan of automobiles, the items 410, 412, 414, 416, 418, 420, 422 displayed on the webpage may be automobile related. Another user, user B, may not see the same listing of items 410, 412, 414, 416, 418, 420, 422 as user A does because user B may not have the same passion for automobile as user A does.

The items 410, 412, 414, 416, 418, 420, 422 may be selected from at least one content database 432 by the server 430. The content database 432 may be generated by the server 430 of the user interface or an independent server (not shown). Further, the content database 432 may be organized as a hierarchical taxonomy, such as Yahoo! Content Taxonomy (YCT). For convenient purposes, in the following disclosure the recommended online content takes articles as examples of items 410, 412, 414, 416, 418, 420, 422, displayed on a user interface.

Figure 5:
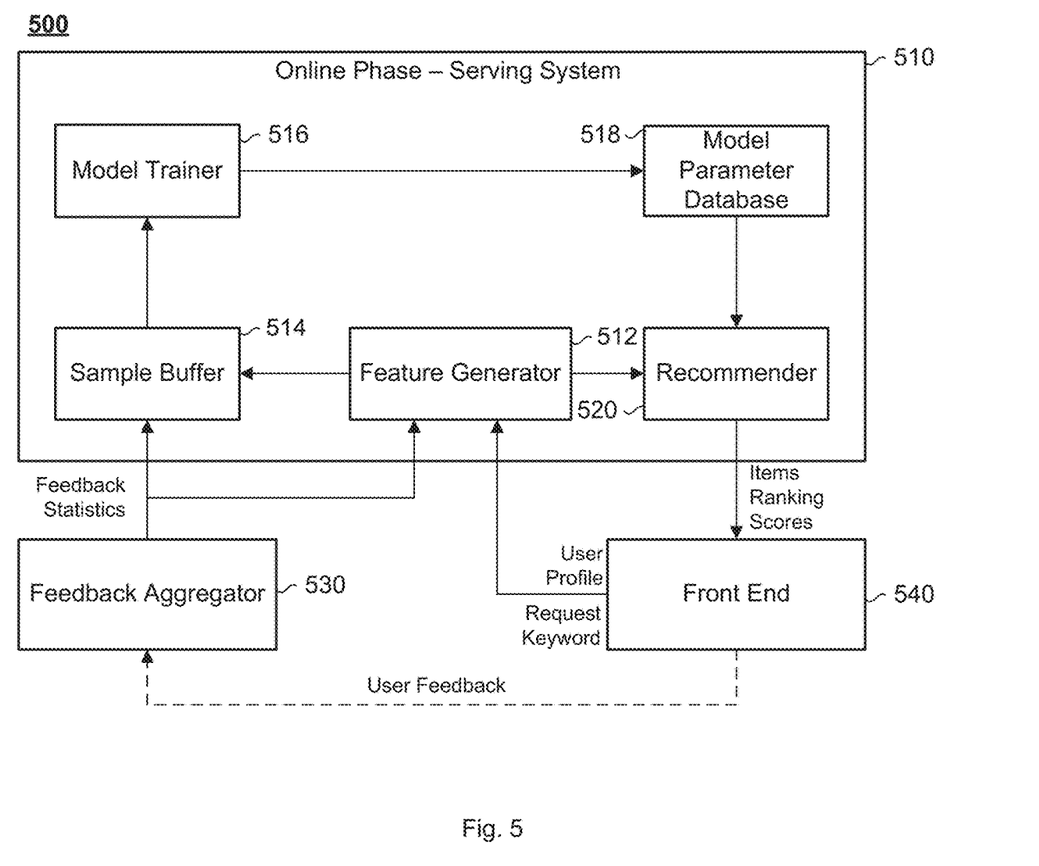
FIG. 5 is a schematic diagram illustrating an online phase-serving system according to the present disclosure.

FIG. 5 is a schematic diagram illustrating an online phase-serving system 500 according to the present disclosure. The online phase-serving system 500 may be a server system to provide online content recommendation to a front end 540. The server system 500 may include one or more servers 200 to function as a feedback aggregator 530, a feature generator 512, a sample buffer 514, a model trainer 516, and a recommender 520, wherein the model trainer 516 and the recommender 520 both may access to a same database of model parameters 518. The front end 540 may be a client device 300 in communication with the one or more servers 200. The front end 540 may install an application that provides a user interface to its user, such as the interface 402. For example, the application may be a general purpose application, such as an Internet browser. The application may also be an application specially designed for a website, such as an eBay™ application.

When the user opens and/or runs the application on the front end 540, the front end 540 may open a target user interface to load content from the online phase-serving system. For example, when the user opens a target webpage on the browser, such as Yahoo! News™, an online phase-serving system from Yahoo! Inc. may send online content, i.e., news from Yahoo!™, to the Yahoo! News™ webpage. The user may be a registered user to Yahoo! Inc. so that Yahoo! Inc. knows who the user is in order to select the online content for the user based on his/her profile information. Similarly, when the user opens a specially designed application, such as an eBay™ application installed in a mobile device, the eBay™ application may automatically logs the user in eBay™ and receive auction information of various products that eBay™ recommends based on the user profile.

The user profile may include various features of the user. For example, the user profile may include age, gender, income, and hobby of the user etc. Details of the user profile may be collected from the user's prior online activities and saved in a database of the online phase-serving system 500. The online phase-serving system 500 may recognize the user via various ways. For example, the online phase-serving system 500 may recognize the user when he/she logs in an account he/she registered with the online content provider, such as Yahoo!™ and/or eBay™, or through the IP address, identity of the client device, and/or cookies cached in the client device that the user is using.

To load the online content, the target user interface may send a user request to load the online phase-serving system when the user opens the user interface from the front end 540 (e.g., the client device 300). The user request may be a default request unaware by the user. For example, when the user opens the eBay™ application or the Yahoo! News™ webpage, the application or the webpage may automatically send out a request to load the online content recommended to the user. The user request may also be a request actively sent by the user. For example, the user may actively input a search query in a search toolbar displayed on the user interface of the eBay™ application or the Yahoo! News™ webpage.

The request may include the user profile so that the online phase-serving system 500 knows the identity of the requester. The user request may also include one or more keywords indicating points of interest of the requester. For example, the default request may include a keyword that is associated with the user profile and nature of the user interface. For example, if the user is interested in skiing and he/she opens the Yahoo! News™ webpage, the default keyword may be associated with both skiing and news.

Thus the online phase-serving system 500 may receive the user profile and one or more keywords when the user opens the user interface from the front end 540 (e.g., the client device 300). Using the user profile, the recommender 520 may determine a list of articles and/or advertisements that are likely to be read and/or clicked by the user. Accordingly, the online phase-serving system 500 may send the list of articles and/or advertisements to the front end 540 as the recommended online content.

As shown in FIG. 5, the user profile may also be sent to the feature generator 512. The feature generator 512 may be configured to identify request features from the user request. For example, the feature generator 512 may extract features from the user profile and the one or more keywords. The features from the user's profile may include, but is not limited to, the user's age, gender, income, point of interest, hobby, etc. Further, the feature generator 512 may also obtain other features such as the location of the front end (e.g., the client device) and the time that the user request is sent as well as parameters of the client device. The parameters of the client device may include model information of the client device, processor speed and screen resolution of the client device etc. The model trainer 516 may later use these features for training a machine learning model for online content recommendation. The recommender 520 may also use these features to pair the features with online contents (e.g., articles, product information, advertisements etc.) in a database in order to evaluate how strong an interest the user would have in reading the online content.

In addition to identifying the request features, the online phase-serving system 500 may also assign identification (hereinafter "request ID") to the user request. For example, the online phase-serving system 500 may determine the request ID via a hash function, where the hash function is a function that can be used to map digital data of arbitrary size to digital data of fixed size. The online phase-serving system 500 may treat the value returned by the hash function as the request ID.

Next, the online phase-serving system 500 may cache the request features and request ID to the sample buffer 514, an online data structure configured to cache request features generated when the online phase-serving system 500 is determining the recommended online content to the user.

In the sample buffer 514, the user request may be indexed with a key, and the features as a vector value. Any user request in the sample buffer 514 is identified through a corresponding request ID. The data may be cached in the sample buffer 514 in unit of <request ID, item ID> pair, i.e., each item (article or advertisement etc.) in the online content is paired up with the corresponding user request. A value of the <request ID, item ID> pair may be the vector value of the features, which including user profiles, client device information, and other features generated from the feature generator 512.

Note that since the user request includes features associated with the user profile, client device parameter, and a request timestamp (i.e., the time that the user request is sent from the front end 540), a user may have different user requests to the online phase-serving system at different time even if the different user requests is about the same subject matter. Further, since a user request may also include context related features, each user request may generate different features even if they are sent from the time, same type of device, users with similar profile, and for the same subject matter. Thus each user request may include unique request features. For example, the online phase-serving system may send different news to the Yahoo! News™ webpage at different time even if the webpage is opened by the same user through the same computer. The news may tend to include more contents related to food, win, and/or restaurant information during dinner time, and the news may tend to include more recreation contents during weekends.

The user request (e.g., request features) may be cached in the sample buffer 514, waiting for a corresponding user feedback to an article of the online content pushed to the front end 540. Since the features for each user request and feedback pair can be very large, the online phase-serving system 500 may cache the request features that generated at query time and the feedback at different time, and then pair up the request features and the feedback using the hashing mechanism that identifies each request by the user, the article that the user left a feedback to, and the timestamp triplet.

The user may leave feedback to the online content recommended and displayed on the front end 540 when he/she takes a predefined action over the user interface. The user feedback may include a click over a certain article (and/or an advertisement), a "like" or "dislike" action over the article, sharing the article and/or forwarding the article to another website, and/or browsing an article over certain period of time, or other measurable browsing behavior over the article, etc.

The sample buffer 514 may cache the user request only for a predetermined time interval. When the user executes a predefined feedback action over an article in the online content, the front end 540 may send the feedback to the online phase-serving system 500. The online phase-serving system 500 may match the feedback to the corresponding user request and the corresponding article if the feedback occurs within the predetermined amount of time from when the online content is displayed on the user interface. The predetermined time interval may be determined based on available memory space, query traffic, feature size, and/or requirements to sample counts in a training process of the model trainer 516. For example, the time interval may vary from a few minute to a few hours.

For example, after the request features of the Yahoo! News™ webpage are cached in the sample buffer 514, the online phase-serving system 500 may wait 10 minutes for the user to react with a feedback. If the user does not conduct a feedback action, such as clicking one of the articles on the webpage, within the 10 minutes, the online phase-serving system 500 may determine that the user is idling and shows no interest in the recommended online content. Accordingly, the online phase-serving system 500 may discard the corresponding user request and the request features in the sample buffer 514. If, however, the user clicks to read an article from the Yahoo! News™ webpage within 10 minutes, the online phase-serving system 500 may receive the click feedback and cache the feedback in the sample buffer 514.

Note that in the present disclosure, the sample buffer 514 may cache the user request for the predetermined time interval depending on available memory space, query traffic, feature size, and/or requirements to sample counts in the training process. If the online phase-serving system 500 needs a longer time window training samples and the memory space is not enough for that, the system 500 may adjust to a different sampling rate to cache the request features instead of caching all requests. A sharding design may also be used in this regard, wherein sharding is a type of database partitioning that separates very large databases the into smaller, faster, more easily managed parts called data shards. In some implementations, the number of features in a training model could reach to billions, thus to hold all features in the training model or sample buffer in a single machine may be difficult. Accordingly, the online phase-serving system 500 may shard the features to groups based on feature key, so that each sharding group may only hold for a part of the features, and both samples and model in this sharding group may be only a subset of the whole dataset.

The user feedback may be sent to the sample buffer 514 via a user feedback pipeline. Different from a general pipeline seen in other recommendation systems, the feedback pipeline in the present disclosure not only may send feedback signals to a database for offline training, but more importantly, the feedback pipeline may transmit the feedback signals back to the sample buffer 514, which is an online component of the online phase-serving system 500.

Through the user feedback pipeline, a user feedback may be sent to the sample buffer 514 individually. Alternatively, information from the user feedback pipeline may be organized as packet of aggregated user feedbacks. For example, the user feedback may be sent to a feedback aggregator 530. The feedback aggregator 530 may collect a plurality of user feedbacks and process the user feedbacks to obtain feedback statistics, such as measuring a probability that an article is clicked and read by a user. Then the feedback aggregator 530 may send the user feedbacks as well as the feedback statistics to the sample buffer 514. The packet of the user feedbacks may include a label, which may be a variable that represents the user feedback for the article. The packet may also contain information to compute the request ID of the corresponding user request. With the hashing mechanism, the sample buffer 514 may match the user feedback with the corresponding user request and request features by looking up the index with the same request and item ID.

Next, the sample buffer 514 may generate a training sample by combining the request features with the corresponding feedback to the online content, i.e., a feedback to an article of the online content. Then the training sample may be sent to the model trainer 516 to train a training model, wherein the model is configured to output parameters for an online content recommendation model.

The model trainer 516 may be a built-in training component to real-time refresh the training model at online. The training model may be any types of computer learning training model that can be used to predict a probability that the user will respond to an online item. For example, the training model may be a general online linear model with gradient descent, such as a linear regression model, and the training model may be organized as a set of parameters for the model features. The training model may be based on a mathematical algorithm. In general, the mathematical algorithm may be expressed as $$y=p(x,a),$$

wherein p is a function that calculates a probability, x is the variables corresponding to a user request, a is a group of parameters of the algorithm, y is the output of the function p, representing the probability that a particular user will respond to an article after the article is sent to the user.

The model trainer 516 may include a training database of historical training samples collected from different users and different feedback events. The sample buffer 514 may send the training sample collected from the front end 540 to the model trainer 516 in real-time, so that the model trainer 516 may update its training database by adding the training sample therein.

When training the content predicting model, the model trainer 516 may take aggregated user feedbacks (i.e., the request features) from the training database as the variables x and aggregated feedback statistics from the training database as the output y. Using the linear regression method, the model trainer may take a plurality of iterations to determine values of the parameters a of the function p. Because the request features in the database are updated in a real-time fashion by the sample buffer 514, the training of the content predicting model may continuously being operated by the model trainer 516.

The model trainer 516 may save the values of the parameters a in the model parameter database 518. The model trainer 516 may not necessarily wait for a completion of the iteration as the training samples is constantly updated in real-time. Instead, the model trainer 516 may real-time update the values in every iteration or every predetermined number of iterations. The updated values are then to be used in real-time and directly in predicting and recommending online contents for users of the online phase-server system 500.

To this end, the updated parameters a in the model parameter database 518 may be real-time accessible by the recommender 520. The recommender 520 may call the values of the parameter a in the model parameter database 518 and use the mathematical algorithm $y=p(x,a)$ as a model to predict online content for a user.

With the online content recommendation model, the recommender 520 may access an online content database to determine a probability value for each items saved therein with respect to a newly received user request, wherein the online content database may include online contents such as news, advertisements, video streams etc. In other words, when the online phase-serving system 500 receives another user request, whether from the same user of the same front end or from a different one, the recommender 520 may determine the probability value for each user request and item pair. An user request and item with higher probability value may indicates that the user may have higher likelihood to respond to the item, such as read the item, click the item, click "like" or "dislike" to the item, or share or forward the item to another webpage. The online phase-serving system 500 may rank the user request and item pairs according to their probabilities and select a predetermined numbers of items with the highest probability value. The recommender then may send the items to the user as the recommended online content. For example, when a user opens the Yahoo! News™ webpage, the recommender 520 may use the content prediction model to pair the user request with all articles, videos, and/or advertisements in the online content database that matches the category "News." Then the recommender may determine a probability value for each pair and select 20 articles, videos, and/or advertisements with the highest probability values and send them to the Yahoo! News™ webpage as the online content recommended to the user.

Figure 6:
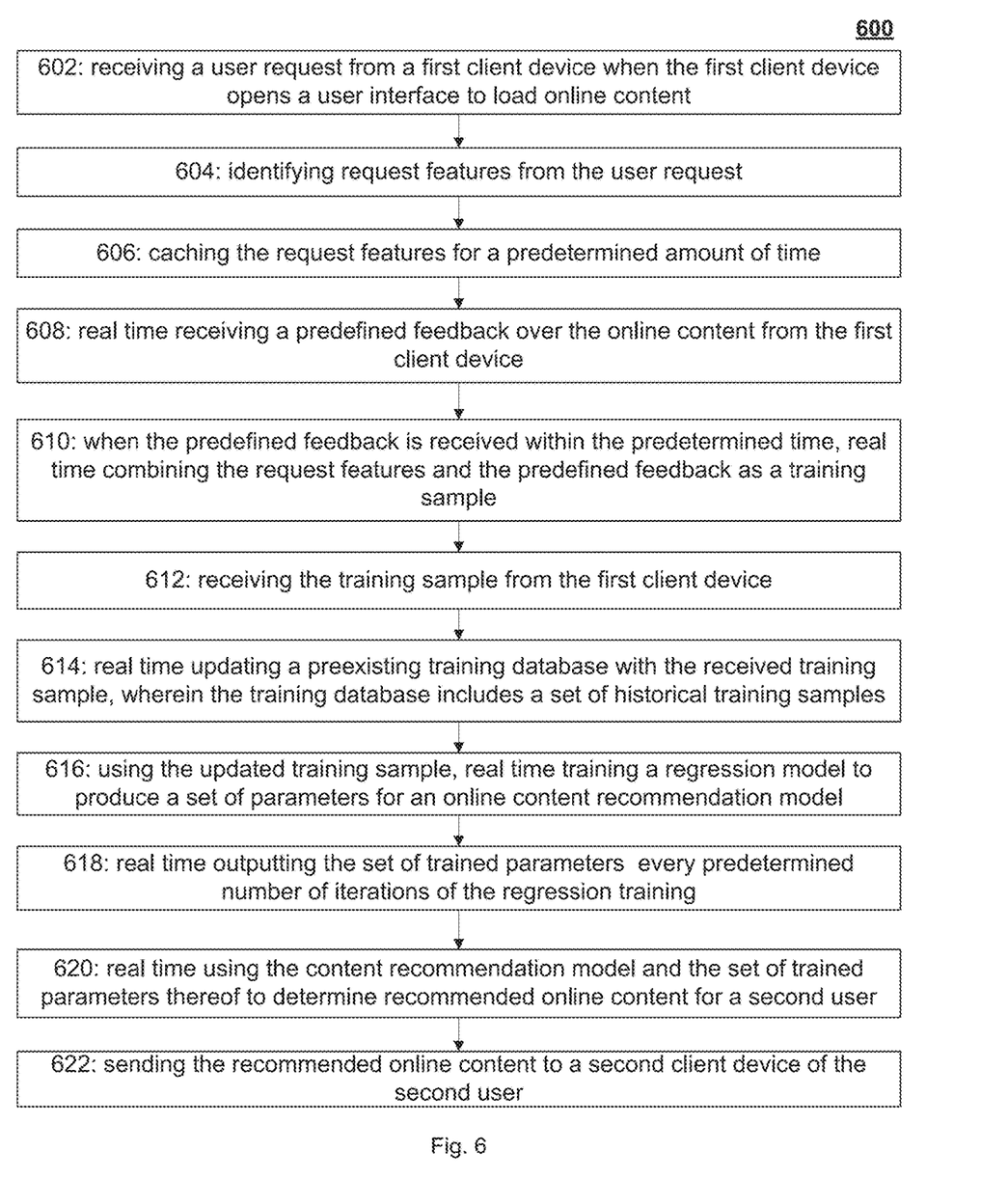
FIG. 6 is a flowchart illustrating a method for recommending online content according to the present disclosure.

FIG. 6 is a flowchart illustrating a method for recommending online content. The method may be implemented as a set of instructions stored in a non-transitory storage medium of a computer system that serves as the online phase-serving system 500. Further, at least one processor of the computer system may execute the set of instructions to perform the following operations:

602: receiving a user request from a first client device in communication with the computer system when the first client device opens a user interface to load online content. According to exemplary embodiments of the present disclosure, the computer system may be in communication with a first client device via a network. When a user opens a user interface, such as a webpage or an interface of an application installed in the client device, the client device may send a user request to the computer system for online content. In response to the user request, the computer may select the online content based on features of the user, the client device, and the time of the request, and then send the online content to the client device.

604: identifying the request features from the user request. After receiving the user request, the computer system may analyze the user request and identify features from the user request. For example, the request feature may include at least one of demographic information of the user, device parameters of the first client device, and a timestamp showing a time that the user request occurs.

606: caching the request features for a predetermined amount of time. In order to obtain training samples from the user, the computer system need not only the request features but also feedback of the online content from the user. To wait for the user feedback, the computer system may cache the request feature for the predetermined time and real-time monitoring feedback actions from the user over the online content.

608: real-time receiving a predefined feedback over the online content from the first client device. When the user conduct a predefined feedback action on the online content, such as a click on the online content, a "like" or "dislike" action over the online content, and/or a sharing action to the online content and/or a forwarding action of the online content to a website, the feedback may be sent to the computer system in real-time.

610: when the predefined feedback is received within the predetermined time from the receipt of the user request, real-time combining the request features and the predefined feedback as a training sample. The computer system may discard the request features if the user conducts no feedback action over the online content. However, if the user does react with a feedback action within the predetermined time interval, the computer system may receive the feedback and match the feedback with the corresponding request features, details of which are introduced in FIG. 5. The combined data of user request and user feedback are then used as a training sample to train a computer model.

612: receiving the training sample from the first client device.

614: real-time updating a preexisting training database with the received training sample. Once the training sample is obtained, the computer system may real-time update a training database with the newly obtained training sample, wherein the training database includes a set of historical training samples prior to the received training sample.

616: using the updated training sample, real-time conducting a regression training to a computer learning training model to produce a set of parameters for an online content recommendation model. While the computer system is receiving the user request and user feedback, the computer system may continuously train a computer learning model using the historical training samples in the training database. Thus when the training database is updated, the computer system may real-time use the updated training database for a next iteration of the training process.

618: real-time outputting the set of trained parameters of the content recommendation model every predetermined number of iterations of the regression training. The computer learning model may be configured to output a set of parameters of the content recommendation model introduced in FIG. 5. To this end, whenever an iteration ends or a predetermined number of iterations ends, the computer system may output and update the set of parameters for the content recommendation model to use. For example, the computer system may store the updated set of parameters in the model parameter database.

620: real-time using the content recommendation model and the output set of trained parameters thereof to determine recommended online content for a second user.

In order to use the updated set of parameters without delay, the computer system may allow the content recommendation model to call the model parameter database in real-time. Thus in this operation, the computer system may real-time call the set of trained parameters of the content recommendation model; based on the request features and for each item of an plurality of online items, determine a probability value that the user will perform a predetermined action over the online item; select a predetermined number of online items from the plurality of online items that have highest probability values; and identify the selected online items as the recommended online content to display on the second client device.

622: sending the recommended online content to a second client device of the second user.

Accordingly, the online phase-serving system and method may be systems and methods that incorporate information prediction and a model training in a single online serving system. The online phase-serving system also includes a sample buffer that joining request features and feedbacks related to an item in a user request together as training samples. With the present disclosure, the online content recommendation phase-serving systems and methods may support recommendation in scale in an online manner, in which the model adapted therein is updated in real-time and with minimal communication cost and much more simplified architecture to save hardware resources of a terminal device and a computer system. As a result, the online phase-serving systems and methods improve technologies of online content recommendation and enhance performances of an electronic device implementing the recommendation methods.

The online phase-serving systems and methods in the present disclosure adopt a unique data gathering and computer data processing procedure. There are at least two differences that distinguish the online phase-serving systems from other content recommendation systems in terms of data collection and processing. First, the online phase-serving systems and methods in the present disclosure collect and generate online training samples via a two-step procedure. The systems and methods first collect a user request for online content and cache the user request in the sample buffer, waiting for a user feedback to an item of the online content only for a predetermined period of time. After receiving the user feedback within the predetermined period of time, the systems and methods combine the feedback with the user request to generate an online training sample. Thus original data of the online training samples are not received by the systems and methods as a single package. Second, the user request and user feedback are transmitted through a feedback pipeline. Different from a general pipeline seen in other recommendation systems, which transmit feedback signals to an offline database, the feedback pipeline in the present disclosure transmits feedback signals back to the sample buffer, an online component of the online phase-serving systems.

In terms of data processing, the online phase-serving systems and methods distinguish themselves from traditional content recommendation systems by integrating data collection, model training, and model utilization into a single real-time data processing procedure. The online training sample is generated in real-time after a user conducted a feedback action to an item in the recommended online content. The training samples are then used to train a computer-learning model in a real-time manner. Training results from the model are then inputted into a content recommendation model to serve to other user request in a real-time manner. Thus the entire procedure of data collection, model training, and model utilization occurs in real-time.

While example embodiments of the present disclosure relate to systems and methods for recommending online content for a user, the systems and methods may also be applied to other Applications. For example, the methods and systems may be applied to online advertising, i.e., recommending advertisements to a user. The present disclosure intends to cover the broadest scope of systems and methods for content browsing, generation, and interaction.

Thus, example embodiments illustrated in FIGS. 1-8 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:
1. A computer system, comprising:
a storage medium comprising a set of instructions for online content recommendation; and
a processor in communication with the storage medium, wherein when executing the set of instructions, the processor is directed to:
  receive in real-time a user request for online content from a first client device;
  identify request features, comprising context related features comprising at least one of a time of day associated with a first type of activity or a day of week associated with a second type of activity, from the user request;
  determine an amount of time of a time interval based on available memory space, wherein a difference between a start of the time interval and an end of the time interval is the amount of time;
  cache, in a buffer, the request features for the amount of time of the time interval;
  after the request features are cached in the buffer, receive in real-time a predefined feedback over the online content requested by the user request from the first client device;
  determine, based on whether the predefined feedback over the online content requested by the user request was received within the amount of time of the time interval, whether to discard the request features identified from the user request for the online content and cached in the buffer or use the request features identified from the user request for the online content and cached in the buffer for training sample generation;
  responsive to the predefined feedback being received within the amount of time of the time interval, that was determined based on the available memory space, from the receipt of the user request:
    generate a training sample by combining in real-time:
      (i) the request features identified from the user request and comprising the context related features comprising at least one of the time of day associated with the first type of activity or the day of week associated with the second type of activity, and
      (ii) the predefined feedback,
    the training sample corresponding to a predefined feedback action taken by a first user interacting with the online content displayed on the first client device;
  receive in real-time a second user request for second online content;
  identify second request features, comprising second context related features comprising at least one of a second time of day associated with a third type of activity or a second day of week associated with a fourth type of activity, from the second user request;
  determine a second amount of time of a second time interval based on second available memory space, wherein a difference between a start of the second time interval and an end of the second time interval is the second amount of time;
  cache, in the buffer, the second request features for the second amount of time of the second time interval;
  after the second request features are cached in the buffer, determine, based on whether second predefined feedback over the second online content requested by the second user request was received within the second amount of time of the second time interval, whether to discard the second request features identified from the second user request for the second online content and cached in the buffer or use the second request features identified from the second user request for the second online content and cached in the buffer for training sample generation;

responsive to determining that the second predefined feedback over the second online content has not been received within the second amount of time of the second time interval determined based on the second available memory space, discard the second request features identified from the second user request for the second online content and cached in the buffer;

update a preexisting training database in real-time based on the training sample generated using the user request for which the predefined feedback was received within the amount of time of the time interval, but not based on the discarded second request features identified from the second user request for which the second predefined feedback was not received within the second amount of time of the second time interval, to generate an updated training sample, wherein prior to being updated based on the training sample received from the first client device, the preexisting training database includes a set of historical training samples;

conduct a regression training to a computer learning model in real-time, using the updated training sample generated based on the training sample generated using the user request but not based on the discarded second request features identified from the second user request, to produce a set of trained parameters for an online content recommendation model and save the set of trained parameters in a model parameter database;

call the set of trained parameters in the model parameter database in real-time to determine recommended online content for a second user with the online content recommendation model; and send the recommended online content to a second client device of the second user.

2. The computer system of claim 1, wherein the amount of time is determined based on the available memory space, an amount of query traffic and a feature size.

3. The computer system of claim 1, wherein the user request is received from the first client device when the first client device opens a user interface to load the online content.

4. The computer system of claim 1, wherein the request features comprise at least one of demographic information of a user, device parameters of a client device, and a timestamp showing a time that the user request occurs.

5. The computer system of claim 1, wherein the predefined feedback comprises at least one of a click of the online content, a "like" or "dislike" action associated with the online content, and at least one of sharing the online content or forwarding to a website.

6. The computer system of claim 1, wherein at least one of the day of week of the context related features corresponds to weekends, or the time of day of the context related features corresponds to evenings.

7. The computer system of claim 1, wherein to determine the recommended online content, the processor is further directed to:
call the set of trained parameters of the online content recommendation model;
based on the request features and for each item of a plurality of online items, determine a probability value that a user will perform at least one predefined feedback action over an online item;
select a predetermined number of online items from the plurality of online items that have highest probability values; and
identify the selected online items as the recommended online content to display on the second client device.

8. A method for online content recommendation, comprising:
receiving in real-time a user request for online content from a first client device;
identifying request features from the user request;
determining an amount of time of a time interval based on at least one of available memory space, an amount of query traffic or a feature size, wherein a difference between a start of the time interval and an end of the time interval is the amount of time;
caching, in a buffer, the request features for the amount of time of the time interval;
after the request features are cached in the buffer, receiving in real-time a predefined feedback over the online content requested by the user request from the first client device;
determining, based on whether the predefined feedback over the online content requested by the user request was received within the amount of time of the time interval, whether to discard the request features identified from the user request for the online content and cached in the buffer or use the request features identified from the user request for the online content and cached in the buffer for training sample generation;
responsive to the predefined feedback being received within the amount of time of the time interval, that was determined based on at least one of the available memory space, the amount of query traffic or the feature size, from the receipt of the user request:
generating a training sample by combining in real-time:
the request features identified from the user request for the online content; and
the predefined feedback,
the training sample corresponding to a predefined feedback action taken by a first user interacting with the online content displayed on the first client device;
updating, by a computer system, a preexisting training database in real-time based on the training sample generated using the user request for which the predefined feedback was received within the amount of time of the time interval, but not based on discarded second request features identified from a second user request, to generate an updated training sample, wherein prior to being updated based on the training sample received from the first client device, the preexisting training database includes a set of historical training samples;
conducting, by the computer system, a regression training to a computer learning model in real-time, using the updated training sample generated based on the training sample generated using the user request but not based on the discarded second request features identified from the second user request, to produce a set of trained parameters for an online content recommendation model;

calling the set of trained parameters in real-time to determine recommended online content for a second user with the online content recommendation model; and sending, by the computer system, the recommended online content to a second client device of the second user.

9. The method of claim 8, wherein the set of trained parameters is saved in a model parameter database and the calling comprises calling the set of trained parameters from in the model parameter database.

10. The method of claim 8, comprising:
receiving in real-time the second user request for second online content;
identifying the second request features from the second user request;
determining a second amount of time of a second time interval based on at least one of second available memory space, a second amount of query traffic or a second feature size, wherein a difference between a start of the second time interval and an end of the second time interval is the second amount of time;
caching, in the buffer, the second request features for the second amount of time of the second time interval;
after the second request features are cached in the buffer, determining, based on whether second predefined feedback over the second online content was received within the second amount of time of the second time interval, whether to discard the second request features cached in the buffer or use the second request features cached in the buffer for training sample generation; and
responsive to determining that the second predefined feedback over the second online content has not been received within the second amount of time of the second time interval, discarding the second request features identified from the second user request and cached in the buffer.

11. The method of claim 8, wherein the request features comprise at least one of demographic information of a user, device parameters of a client device, and a timestamp showing a time that the user request occurs.

12. The method of claim 8, wherein the predefined feedback comprises at least one of a click of the online content, a "like" or "dislike" action associated with the online content, and at least one of sharing the online content or forwarding to a website.

13. The method of claim 8, wherein the set of trained parameters of the online content recommendation model is output every predetermined number of iterations of the regression training.

14. The method of claim 8, wherein the determining of the recommended online content comprises:
calling the set of trained parameters of the online content recommendation model;
based on the request features and for each item of a plurality of online items, determining a probability value that a user will perform a predetermined action over an online item;
selecting a predetermined number of online items from the plurality of online items that have highest probability values; and
identifying the selected online items as the recommended online content to display on the second client device.

15. A computer-readable non-transitory storage medium, comprising a set of instructions for online content recommendation, wherein the set of instructions, when executed by a processor of a computer system, directs the processor to perform operations:
identifying request features from a user request associated with a first client device;
caching, in a buffer, the request features;
after the request features are cached in the buffer, receiving in real-time a predefined feedback from the first client device;
determining, based on whether the predefined feedback was received within an amount of time of a time interval, whether to discard the request features identified from the user request and cached in the buffer or use the request features identified from the user request and cached in the buffer for training sample generation;
responsive to the predefined feedback being received within the amount of time of the time interval, generating a training sample by combining in real-time:
(i) the request features identified from the user request, and
(ii) the predefined feedback,
the training sample corresponding to a predefined feedback action taken by a first user interacting with online content displayed on the first client device;
updating a preexisting training database in real-time based on the training sample generated using the user request for which the predefined feedback was received within the amount of time of the time interval, but not based on discarded second request features identified from a second user request, to generate an updated training sample, wherein prior to being updated based on the training sample received from the first client device, the preexisting training database includes a set of historical training samples;
producing a set of trained parameters for an online content recommendation model based on the updated training sample generated based on the training sample generated using the user request but not based on the discarded second request features identified from the second user request;
determining recommended online content for a second user with the online content recommendation model; and
sending the recommended online content to a second client device of the second user.

16. The computer-readable non-transitory storage medium of claim 15, wherein the operations comprise:
receiving in real-time the user request for the online content from the first client device; and
caching the request features for a predetermined amount of time.

17. The computer-readable non-transitory storage medium of claim 16, wherein the user request is received from the first client device when the first client device opens a user interface to load the online content, and
the request features comprise at least one of demographic information of the first user, device parameters of the first client device, and a timestamp showing a time that the user request occurs.

18. The computer-readable non-transitory storage medium of claim 16, wherein the predefined feedback comprises at least one of a click of the online content, a "like" or "dislike" action associated with the online content, and at least one of sharing the online content or forwarding to a website.

19. The computer-readable non-transitory storage medium of claim 15, wherein the set of trained parameters of the online content recommendation model is output every predetermined number of iterations of regression training associated with producing the set of trained parameters.

20. The computer-readable non-transitory storage medium of claim 15, wherein the operations comprise:
- identifying the second request features from the second user request;
- caching, in the buffer, the second request features;
- after the second request features are cached in the buffer, determining, based on whether second predefined feedback was received within a second amount of time of a second time interval, whether to discard the second request features cached in the buffer or use the second request features cached in the buffer for training sample generation; and
- responsive to determining that the second predefined feedback has not been received within the second amount of time of the second time interval, discarding the second request features identified from the second user request and cached in the buffer.

\* \* \* \* \*